United States Patent [19]
Miekka et al.

[11] Patent Number: 5,629,068
[45] Date of Patent: May 13, 1997

[54] METHOD OF ENHANCING THE VISIBILITY OF DIFFRACTION PATTERN SURFACE EMBOSSMENT

[75] Inventors: Richard G. Miekka, Sudbury; Richard A. Fotland, Holliston; Frederick N. Miekka, Billerica; John J. Fitch, Natick, all of Mass.; Karl Josephy, Los Angeles, Calif.

[73] Assignee: Avery Dennison Corporation, Pasadena, Calif.

[21] Appl. No.: 474,510

[22] Filed: Jun. 7, 1995

Related U.S. Application Data

[62] Division of Ser. No. 882,187, May 11, 1992, Pat. No. 5,549,774.
[51] Int. Cl.$^6$ ............... B32B 3/00; G02B 5/18; A47G 35/00
[52] U.S. Cl. ............ 428/148; 428/42.1; 428/161; 428/167; 428/168; 428/172; 428/206; 428/208; 428/328; 428/402; 428/913; 428/542.2; 359/15; 359/572; 359/576
[58] Field of Search ............... 428/156, 172, 428/148, 40.1, 42.2, 161, 167, 168, 143, 206, 208, 328, 402, 913, 542.2; 430/1; 359/15, 530, 572, 576; 40/625, 626, 630; 156/277, 209

[56] References Cited

U.S. PATENT DOCUMENTS

| | | | |
|---|---|---|---|
| 3,689,346 | 9/1972 | Rowland | 156/245 |
| 4,127,693 | 11/1978 | Lemelson | 428/163 |
| 5,468,540 | 11/1995 | Lu | 428/156 |

*Primary Examiner*—Donald Loney
*Attorney, Agent, or Firm*—Christie, Parker & Hale, LLP

[57] ABSTRACT

Methods for enhancing the visibility of and imparting a metallic luster to holographic and diffraction pattern surface embossments on transparent media such as plastic films (12) are disclosed. Enhancement is achieved by (1), metallic effect dyes or (2), metal flake inks containing minimal quantities of resinous binders (3), inks containing crystalline pigments that have metallic visual effects, or (4), inks containing pigments formed of optical stacks. The solvent used during application of the dye or ink must not be a solvent for the embossed surface.

49 Claims, 3 Drawing Sheets

METHOD OF ENHANCING THE VISIBILITY OF DIFFRACTION PATTERN SURFACE EMBOSSMENT

CROSS-REFERENCE TO RELATED APPLICATION

This is a division of application Ser. No. 07/882,187 filed May 11, 1992 U.S. Pat. No. 5,549,774.

FIELD OF THE INVENTION

This invention relates to the decoration of sheeting and, more particularly, to the decoration of materials such as thin transparent plastic films. This invention also relates to the embossment of plastic film and more particularly to improved methods for making embossed patterns visible to the human eye.

DESCRIPTION OF THE PRIOR ART

There are wide-spread applications for embossed plastic films. One example is provided by plastic films embossed with holographic patterns. These are used in application where security sensitive items such as holographic labels are used. They are also used for decorative applications such as self adhesive stickers and gift wrap.

The above-described embossments on plastic films are usually-made clearly visible by depositing a thin layer of metal (usually aluminum) on the embossed surfaces to give a mirror-like luster which intensifies the visibility of the embossments. This thin layer of metal is generally applied to the surface by a process known as vacuum metallization. In that process, the film to be metallized is placed in a large vacuum chamber and, after a high vacuum is achieved, is passed over a series of crucibles or evaporation boats containing molten metal. The metal deposits from the vapor phase onto the moving plastic web. This method of metallization can be conducted at high speeds (up to 2000 ft. per min.) on wide webs, but has several significant disadvantages. One disadvantage is that the metallizing equipment is very expensive. A second disadvantage is that the metal can only be applied as a uniform coating or, by using appropriate masks, in swipes running in the machine (long) direction of the plastic film web. If it is desired to create a discreet metallized pattern, this is usually accomplished by first metallizing the surface overall, then etching away the unwanted metal by use of a corrosive etchant such as caustic soda or an acid. The etching process is expensive because it entails an additional manufacturing step, specialized machinery, and handling and disposal problems with the etchant. Another disadvantage of the vacuum process is that the metal can only be applied at one level of deposition, whereas it is often desirable to have different levels of metal deposited at different points on the plastic film to produce partial transparency or other special effects. Still another disadvantage of the vacuum metallization technique is that it is not suited for use on narrow webs or small rolls of film, and is especially uneconomical to use when the film is in sheet form.

It is accordingly an object of the present invention to provide improved and simplified methods to render images visible.

Another object of the invention is to allow the application of metal or metallic effect materials to embossed films without the need for expensive vacuum equipment.

It is yet another object of the invention to allow the metallic decoration of embossed films on conventional printing presses.

A further objective is to provide methods: for producing metal or metal-like deposits on discreet areas of embossed films without the necessity of using corrosive etchants.

An additional object of the invention is to provide means to obtain a wide variation of metallic or metal-like deposits ranging from almost completely transparent to totally opaque, all produced in-line on a single standard press.

A still further object of the invention is to allow the metallization of small quantities of embossed film in an economical manner.

SUMMARY OF THE INVENTION

In accomplishing the foregoing and related objects, the invention involves the printing of a metal flake ink or "metallic effect" ink onto a transparent or translucent film which has an embossed pattern on at least one surface. The pattern may be of a spacial scale suitable for a diffraction pattern, a holographic image, or a microscopically-visible image. It might also be of a larger spacial scale suitable for macroscopically visible images or patients. The "metallic effect" ink or metal flake ink contains a solvent and/or diluent liquid which may be water or an organic liquid, but which is not a significant solvent for the plastic film or the embossment.

The systems of the present invention, which systems substitute for vacuum-deposited metal films, fall into four types. The type one system involves printing inks which employ, as their pigment, a special form of metal flake. This form is highly reflective, very thin (preferably 100 to 500 angstroms), and large in length and width (diameter) (functionally, 0.1 to 50, and preferable 10 to 50 microns). Of particular preference is a new class of such flakes which are themselves embossed.

The type two systems involve the application of certain dyes, which, when properly applied, simulate and enhance the visual effect that would be brought about by the vacuum-deposited metal films.

The type three, systems involve inks which use, as pigment, a crystalline material such as graphite or sulfides or selenides, including $MoS_2$, $PbS$, $FeS_2$, $CoS$, $Ni_3S_2$, $SnS_2$, $ZrS_2$, possessing delocalized electrons.

The type four systems are inks which use, as pigment, particles of optical stacks, particularly those with an embossed surface.

In a typical application, a clear sheet of plastic would be embossed on one side. The embossed side would then be printed with the inks involved in this invention. The printing may be selective, that is, some of the sheet may be rendered opaque, some rendered translucent, some rendered transparent, but colored, and some not printed and therefore transparent. The embossed and printed side may then be bonded to a printed side of an opaque card of cardboard or plastic in order to complicate forgery or alteration of the card.

BRIEF DESCRIPTION OF THE DRAWINGS

The character of the invention, however, may best be understood by reference to one of its structural forms, as illustrated by the accompanying drawings, in which.

DESCRIPTION OF THE PREFERRED EMBODIMENT

Figure 1:
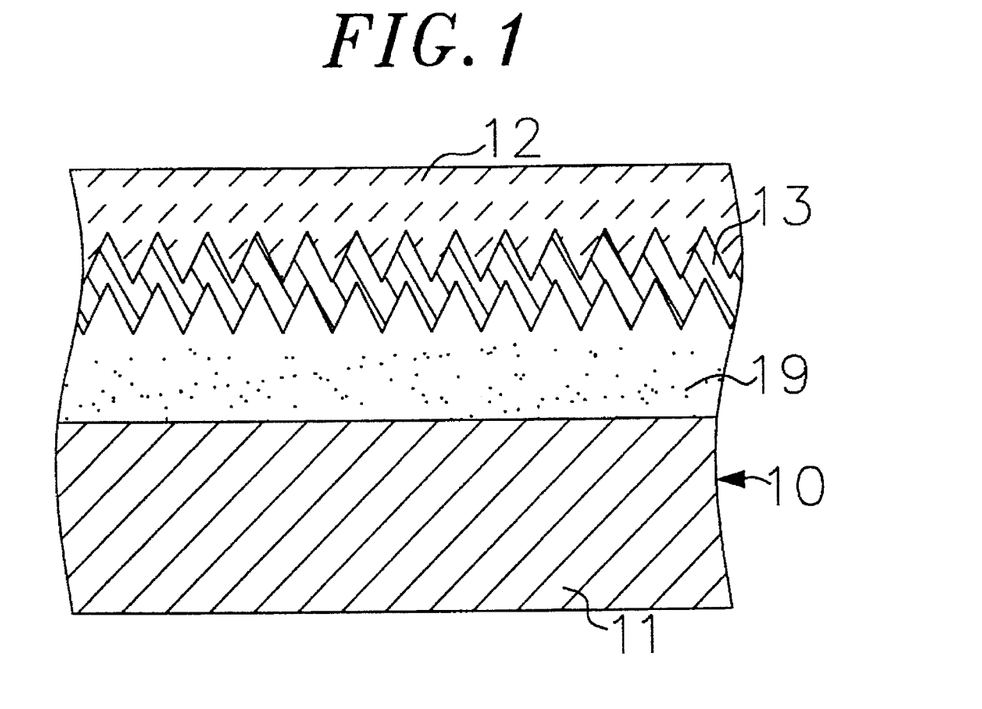
FIG. 1 is a cross-sectional view of a laminated decorative sheet embodying the principles of the present invention.

Referring first to FIG. 1, wherein are best shown the general features of a laminated decorative sheet embodying the principles of the present invention, the sheet, denominated generally by the numeral 10, is shown to include a backing sheet 11, and a transparent cover sheet 12 adhesively bonded to one surface of the backing sheet 11 by adhesive 19.

The inside surface of the cover sheet 12 is embossed with a diffraction grating or holographic image. This inside surface is printed with a layer of the type one, two or three ink 13, which simulates the optical effect of metallizing that surface, when the cover sheet 12 is viewed from its outer surface. In this simple laminate, the optical effect not only provides a decorative aspect, but also is difficult to duplicate by forgers.

Figure 2:
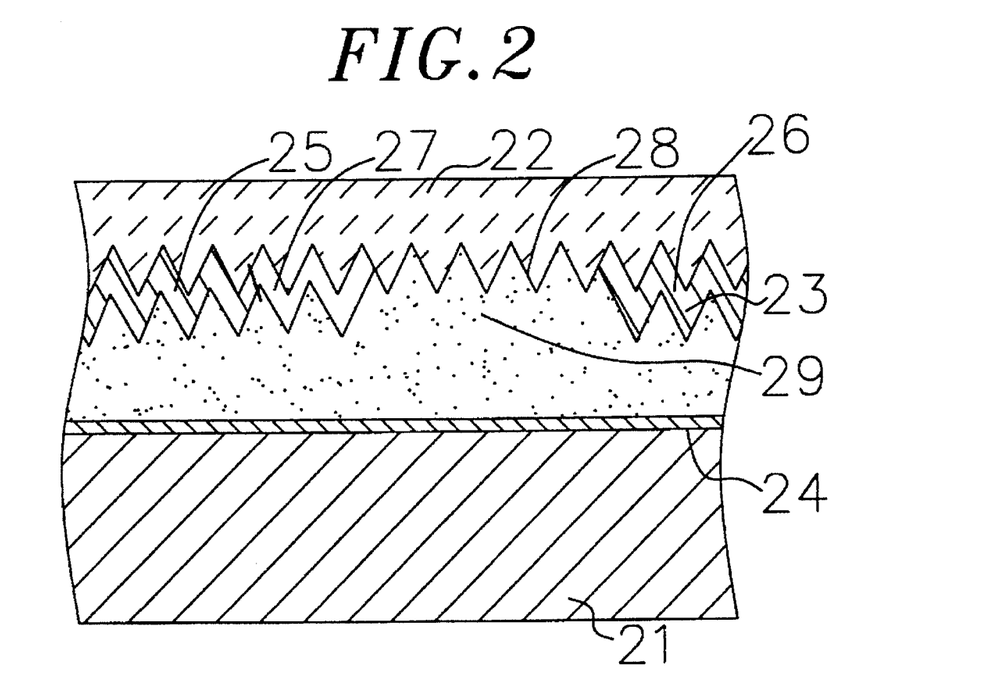
FIG. 2 is a cross-sectional view of a second laminated sheet embodying the principles of the present invention.

A more complex structure is presented ha FIG. 2. In this structure, the inside surface of the backing sheet 21 is printed with information 24 which requires protection from forgery or alteration. The transparent, embossed cover sheet 22 is printed with the layer of type one, two or three ink 23, but not uniformly. In zone 25 and 26, the ink is thick and essentially opaque. The printing 24 does not show through the cover sheet 22. In zone 27, the ink is thin and translucent so that the printing 24 is visible but somewhat obscured. In zone 28, there is no ink so the printing is clearly visible through the adhesive 29 and the embossing is invisible. This structure is very difficult and complex to duplicate or forge. It therefore provides an effective anti-forgery and anti-alteration system. Because the ink is applied using a printing process, precise control of the zone or windows in the sheet and the pattern of decoration or obscurity can be achieved.

Figure 3:
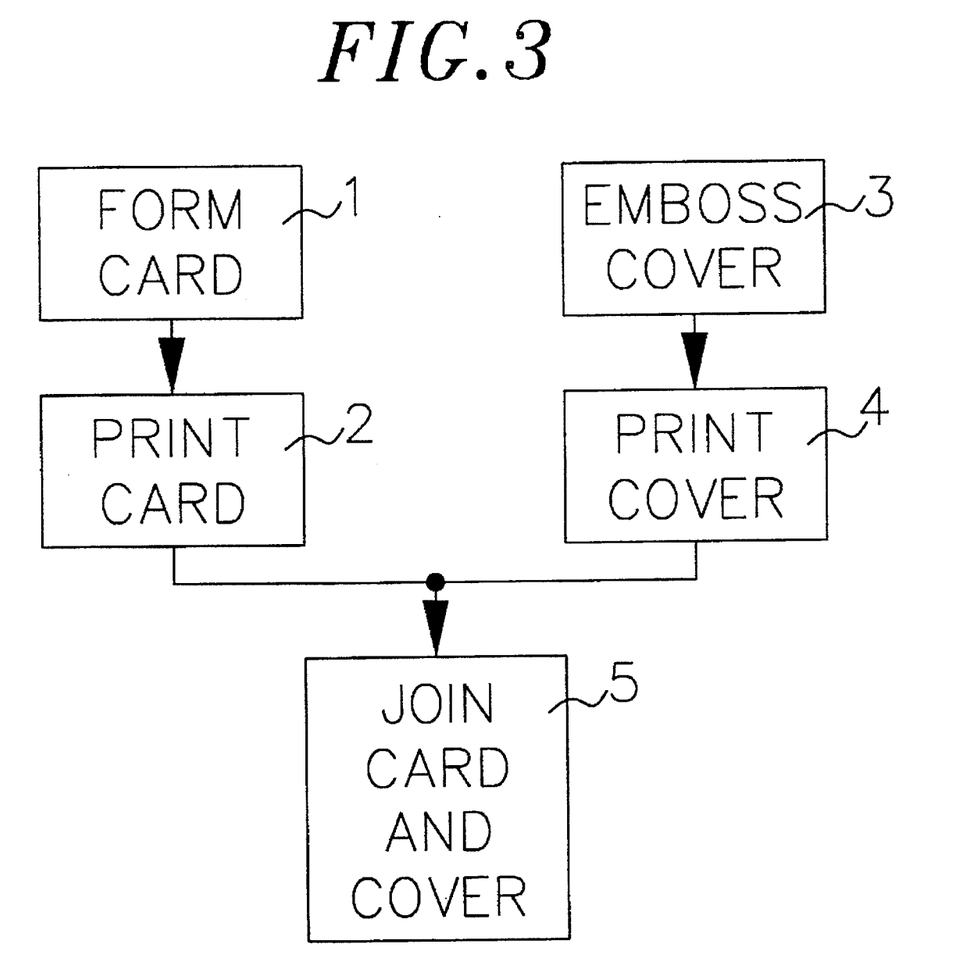
FIG. 3 is a flow chart expressing the process steps embodying the principles of the present invention.

FIG. 3 provides a flow chart of the steps employed in a typical application of the present invention. In step 1, the card or backing sheet is formed. In step 2, the card in printed with the sensitive information. In step 3, the cover sheet is embossed. In step 4, the embossed surface is selectively printed with the type one, two or three ink. In step 5, the printed side of the card and the printed side of the cover are adhesively bonded to form the product.

In an alternative, the sensitive information could be printed on the embossed surface before or after the ink of the present invention is printed on the embossed surface.

Figure 4:
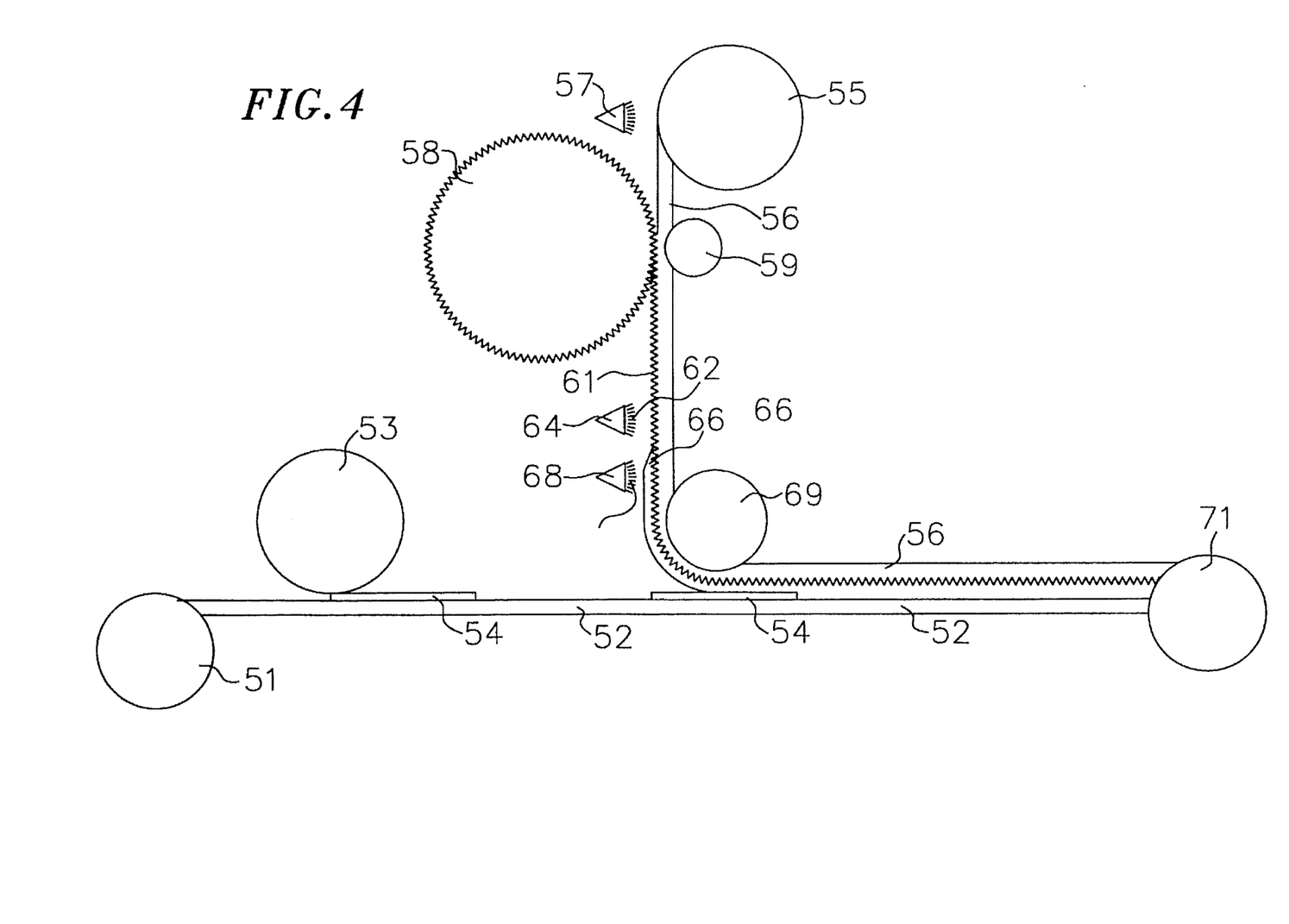
FIG. 4 is a schematic representation of a process for creating laminated decorative sheets embodying the principles of the present invention.

FIG. 4 presents a schematic representation of a process by which the product embodying the present invention might be constructed. Supply roll 51 provides an elongated belt of backing sheet 52. As the backing sheet 52 passes along the path, printing roll 53 prints sensitive information 54 on the surface of the backing sheet 52. Simultaneously, feed roll 55 provides smooth cover sheet 56 to softener lamp 57, embossing roll 58, and backing roll 59. The inside surface of the cover sheet is embossed.

The embossed surface 61 is then selectively printed with the metallic-effect ink 62 by printing head 64. The adhesive 66 is the applied to the cover sheet by adhesive head 68. Then roll 69 presses the backing sheet 52 and the cover sheet 56 together to adhesively bond the printed surfaces. The resulting laminate is stored on take-up roll 71. The product is subsequently cut into useful sizes.

The systems of the present invention, which systems substitute for vacuum-deposited metal films, fall into four types. The type one system involves printing inks which employ, as their pigment, a special form of metal flake. This form is highly reflective, very thin (preferably 100, to 500 angstroms when aluminum is employed), and large in length and width (diameter) (functionally 0.1 to 50 and preferable 10 to 50 microns when aluminum is employed ). Of particular preference are a new class of such flakes which are themselves embossed.

The metal flakes are used in two separate diameter ranges and thereby function in two separate regimes. The first preferred regime involves flakes with average diameters greater than or significantly greater than the average peak-to-peak distance (wave length) of the embossment. These flakes appear to bridge across the embossment peaks to achieve their mirror-like optical effect.

The second regime involves flakes with diameters smaller than the wave length of the embossments and especially smaller than the slope (peak-to-valley) length. These flakes tend to leaf the slopes of the embossment to achieve their mirror-like optical effect.

The type two systems involve the application of certain compounds, which, when properly applied, simulate and enhance the visual effect that would be brought about by the vacuum-deposited metal films.

The type three systems involve inks which use pigments such as graphite, which are strong optical absorbers.

The type four system involves inks which use, as pigment, particles of optical stacks, and particularly those with an embossed surface.

The metal flakes of the invention are preferably those produced by vacuum metallizing a solvent-soluble coating on a supporting substrate to produce a mirror-like deposit generally between about 100 to 500 Angstrom units (for aluminum) in thickness. The substrate and its coatings are then immersed in a solvent bath to dissolve the soluble coating so that the metal layer floats free in the solvent. After repeated rinsings and filtrations or centrifugations, the dispersion containing the metal layer becomes nearly free of the solvent soluble coating material. The purified metal layer is then broken up into fine particles by high shear mixing. The resulting material is finally diluted with an appropriate solvent and a vehicle or binder is added to form the final ink. It is critical for the present invention that the binder-to-metal flake ratio be carefully controlled as will be discussed later. Such inks, when properly prepared, are of low viscosity. They can be applied by spray or printed by gravure of flexographic means onto smooth transparent films. This produces a mirror-like metal surface when viewed through the unprinted surface of the transparent film (known as second surface viewing). A representative metal flake product of the aforementioned type is known by the trademark Metalure™, produced by the Avery Dennison Corporation.

The "metallic effect" dyes of the invention are preferably selected from the group consisting of crystal violet and rhodamine B. Other dyes that also function are fuchsin, methyl violet, safranine, fluorescein, rhodamine, and mauveine. Type three crystalline materials having delocalized electrons also function for this application. Although the preferred material is graphite, other appropriate materials are $FeS_2$, $MoS_2$, or $PbS$. Appropriate materials must (1) have a crystalline structure with delocalized electrons, (2) have high optical absorption, greater than $10^4 cm^{-1}$, with good reflectivity near the surface, and (3) have a smooth surface on a microscopic scale. Furthermore, because the preferred method of attaching the crystalline material to the embossed surface involves application as pigment in a binder, it is desirable that the material be capable of achieving high pigment/binder ratio. Other possible materials are potassium permanganate, iodine, cadmium selenide, polydiacetylenes, silicon or germanium.

In the practice of the invention, a plastic film is embossed using well known methods (e.g., embossing the surface of a polyethylene teraphthalate film by pressing it in contact with a heated nickel embossing shim at high pressure). Such embossments may have a depth of less than 0.5 microns, and a spatial frequency (wave length) of 1.5 microns or less. After the transparent film is embossed, the pattern is discernable if viewed under favorable lighting condition, such as bright illumination by a point lighting source, but very faint or virtually invisible if viewed under more diffuse (e.g., fluorescent) lighting conditions. The pattern on the film is made more strongly visible by being printed with a metal flake ink containing not more than about 2.5 parts of binder solids (by volume) per part of metallic flakes. Above 2.5 parts of binder per part of metal pigment, the embossed pattern loses contrast because the binder fills in the embossed pattern and "blinds" or "quenches" it. This is because the binder has a refractive index which is close to that of the film so that, when it fills in the embossment, the appearance becomes that of a flat, unembossed film. If the binder content drops below about 0.1 per part of metallic flakes, the flakes are not adhered together tenaciously, and may be removed easily, for example, with adhesive tape.

More specifically, the functional range of binder to flake ratio is 0.01 to 2.5 and the most preferred range is 0.5 to 1.0. Binders include vinyl chloride/vinyl acetate copolymers, vinyl, acrylic, urethane, polyester, terpene/phenol, polyolefin, silicone, cellulosic, polyamide, and rosin ester resins. Polyamide and acrylic provide the best adhesion to Mylar.

Although the preferred method of attaching the flakes to the embossed surface would be with and by a binder, other methods are possible. For example, a short wash of the embossed surface with a solvent to the surface, sufficient to make the surface tacky, could then be followed by exposure of the flakes to the still tacky surface to make them stick to the surface. Similarly, hot air, or radiant heat or warm flakes could render the surface tacky for application and holding of the flakes. The simplest approach would be to apply the flakes to the surface while it is still soft and tacky from the embossing step. It would also be possible to apply a holding sheet over the back of the flakes on the surface to hold the flakes to the surface. The flakes have a tendency, even without binder, to stick to the embossed surface and to each other, weakly, but sometimes usefully, A variation of this basic concept of metal-flake based ink, which variation appears to be novel itself involves causing the flakes themselves to have embossed surfaces. This process is described in detail in a copending application. To accomplish this, the above-described metal flake forming process is modified by forming the original metal sheets on a soluble substrate which is itself embossed. This single modification of the conventional process causes the resulting metal flakes to be embossed on both sides. When these flakes are used to form ink, and then printed on embossed, or even on smooth plastic film, a dramatic visual effect results.

Alternatively, the pattern on the film is made more strongly visible by the application of crystal violet dye or rhodamine dye, from solution, to obtain final dried coating weights of dye between a minimum of $10^{-3}$ grams per sq. meter and maximum of 1.0 grams per square meter (gsm). Below the minimum coating of dye, the embossment receives a strong purple coloration, but no strengthening of the embossing-pattern visual effect occurs. At the lower application weights of the dyes, the metallic effect can be enhanced if the dye is backed by a black coating or a metallic coating (e.g., by conventional aluminum inks). The unusual interaction between dyes, in sufficient thickness, and the embossed plastic surface simulates the optical effect of the metallized embossed surface.

Another method to make the pattern on the film more strongly visible is to apply a coating using pigments having strongly delocalized electrons such as graphite and sulfides.

A particular type of pigment which would have application in the inks of the present invention is called an optical stack and is described in U.S. Pat. No. 4,168,986 to Joseph J. Venis, entitled, "Method for Preparing Lameliar Pigments", and U.S. Pat. No. 5,084,351 to Roger W. Philips et al., entitled, "Optically Variable, Multilayer Thin Film Interference Stack on Flexible Insoluble Web". The teachings of both of these patents are incorporated herein by reference.

By precisely controlling the thickness of layers of optically-effective materials and the formation of optically-effective layer boundaries, interesting and useful optical effects can be produced when light impinges on the optical stack.

Of particular interest for this invention would be a process of making optical stack pigment flakes that are initially formed on an embossed carrier (or embossed carrier-release layer). In that way, the optical stack would carry the embossment. The stack could be formed on the embossed carder either with the front surface against, or away from the carder. Furthermore, the layer adjacent the carder may be applied to fill the embossment so that subsequent layers have parallel boundaries and/or the first layer may be a supplemental cover layer which simply places an embossed cover on the rest of the stack. Alternatively, the stack layers can be laid on so that each follows the embossment or proportionally follows the embossment (i.e., uniform frequency bat reduced amplitude). When the stack is removed from the carrier and employed as a pigment, the optical effects of the stack and embossment on each stack particle would occur. This invention would also include forming the optical stack on an embossed transparent or opaque substrate surface and using the resulting product, in sheet form, with or without the substrate, for various decorative or security items.

In its preferred application, the decorative sheet of the present invention would be laminated via a pressure sensitive adhesive or conventional laminating adhesive to the face of paper board or plastic identification cards, or the like, to complicate the forgery or unauthorized alteration of the cards. In one embodiment, the thickness of the ink layer is small enough so that the card information is visible through the decorative film. In another embodiment, only a portion of the card is covered with an opaque layer which displays an optical decoration, such as a holographic image. Normally, the coated embossed side would be between the sheet and its substrate.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desire to secure by Letters Patent is:

We claim:

1. A decorative sheet comprising a sheet of base material having a first surface and a second surface, in which the first surface is embossed with an optical diffraction pattern or a holographic image; and a metallic effect ink bonded to the first surface of the sheet and forming, with the first surface, an interface which approximates the light reflective properties of an interface formed by vacuum metallization, wherein the metallic effect ink is formed of a binder containing metallic flakes, and in which the metallic flakes are embossed by metallizing an embossed carrier sheet, removing the metallized layer from the embossed sheet, and producing finely divided embossed metallic particles used as the metallic pigment for the metallic effect ink, the metallic effect ink printed on at least a portion of the embossed first surface of the sheet for enhancing the visibility of the embossed surface.

2. A product as recited in claim 1, wherein the sheet of base material is light transmitting, the first surface of the sheet is bonded to a backing sheet bearing visual information, and a pressure sensitive adhesive bonds said first surface to said backing sheet.

3. A product as recited in claim 1, wherein the ratio of binder to metallic particles is great enough to bind the particles to the first surface, and small enough to avoid quenching the optical effect caused by the embossment.

4. A product as recited in claim 1, wherein the volume ratio of binder to metallic particles is in the range of 0.01 to 2.5.

5. A product as recited in claim 1, wherein the ink contains sufficient binder to bond the particles to the first surface while the amount of binder is below the amount required for the binder to substantially fill the embossment and quench the optical effect of the embossment.

6. A product as recited in claim 1, wherein the metallic particles have a thickness of 100 to 500 Angstroms and an average diameter of 10 to 50 microns.

7. A product as recited in claim 1, wherein the volume ratio of binder to metallic particles is in the range of 0.01 to 2.5, and the metallic particles have a thickness of 100 to 500 Angstroms and an average diameter of 10 to 50 microns.

8. A product as recited in claim 1, in which the printing ink contains embossed metallic particles having a diameter greater than the average peak-to-peak distance between the embossments on the sheet.

9. A product as recited in claim 1, wherein the ink is a printing ink containing embossed metallic particles having an average diameter less than the peak-to-peak distance between the embossments on the sheet.

10. A security product comprising:

(a) a sheet of base material having a first surface and a second surface, wherein the first surface has an embossed region with an optical diffraction grating pattern, a holographic image pattern, or a microscopically visible image, and wherein the sheet of base material is light transmitting;

(b) a metallic effect ink printed directly on the embossed region of the first surface of said sheet to form, with the first surface, an interface which approximates the light reflective properties of an interface formed by vacuum metallization, in which the metallic effect ink is selected from the group consisting of (1) a binder containing metallic flakes, (2) a dye selected from the group consisting of crystal violet, rhodamine B, fuchsine, methyl violet, safranine, fluorescein, rhodamine, and mauveine, (3) an ink containing graphite as its pigment, and (4) an ink containing a metallic sulfur compound as its pigment; and (c) a backing sheet having a surface bonded to the metallic effect ink-printed and embossed sheet so that said surface of the backing sheet and/or visual information provided between said backing sheet surface and the metallic effect ink-printed region of said embossed sheet are obscured by or visible through the metallic effect ink when viewing the product through the light transmitting embossed sheet.

11. A sheet as recited in claim 10, wherein a layer of pressure sensitive adhesive is positioned between the embossed surface of the base material and said backing sheet.

12. A sheet as recited in claim 10, wherein the ratio of binder to metallic flakes is great enough to bind the flakes to the embossed surface of the base material, and small enough to avoid quenching the optical effect caused by the embossment.

13. A sheet as recited in claim 10, wherein the volume ratio of binder to metallic flakes is in the range of 0.01 to 2.5.

14. A sheet as recited in claim 10, wherein the volume ratio of binder to metallic flakes is in the range of 0.5 to 1.0.

15. A sheet as recited in claim 10, wherein the ink contains sufficient binder to bond the flakes to the embossed surface while the amount of binder is below the amount required for the binder to substantially coat the embossed surface with binder.

16. A sheet as recited in claim 10, wherein the embossed surface is embossed with an embossment, and the ink contain sufficient binder to bond the flakes to the embossed surface while the amount of binder is below the amount required for the binder to substantially fill the embossment and quench the optical effect of the embossment.

17. A sheet as recited in claim 10, wherein the metallic flakes have a thickness of 100 to 500 Angstroms.

18. A sheet as recited in claim 10, wherein the metallic flakes have an average diameter of 10 to 50 microns.

19. A sheet as recited in claim 10, wherein the metallic flakes are aluminum.

20. A sheet as recited in claim 10, wherein the ink includes a pigment formed of optical stacks.

21. A sheet as recited in claim 10, wherein the ink includes a pigment formed of optical stacks having an embossed surface.

22. A sheet as recited in claim 10, wherein an optical stack is formed on one side of the sheet.

23. A sheet as recited in claim 10, wherein the ink is formed of a binder and embossed metal flakes.

24. A sheet as recited in claim 23, wherein the metallic flakes have a thickness of 100 to 500 Angstrom.

25. A sheet as recited in claim 23, wherein the metallic flakes have an average diameter of 10 to 20 microns.

26. A sheet as recited in claim 23, wherein the metallic flakes are aluminum.

27. A sheet as recited in claim 23, wherein the metallic flakes are formed by vacuum metallizing a thin layer of metal on an embossed carrier.

28. A sheet as recited in claim 23, wherein the metallic flakes are formed by vacuum metallizing a thin layer of metal on an embossed release layer on a carrier.

29. The product as recited in claim 10, wherein the metallic flakes are formed by vacuum metallizing a thin layer of metal on an embossed carrier.

30. The product as recited in claim 10, wherein the metallic flakes are formed by vacuum metallizing a thin layer of metal on an embossed release layer on a carrier.

31. A security product comprising:
(a) a sheet of base material having a first surface and a second surface, wherein the first surface is embossed with an optical diffraction grating pattern, a holographic image pattern, or a microscopically visible image and wherein the sheet of base material is light transmitting;
(b) a metallic effect ink printed on the first surface of the sheet to form, with the first surface, an interface which approximates the light reflective properties of an interface formed by vacuum metallization, in which the metallic effect ink is selected from the group consisting of (1) a binder containing metallic flakes, (2) a dye selected from the group consisting of crystal violet, rhodamine B, fuchsine, methyl violet, safranine, fluorescein, rhodamine, and mauveine, (3) an ink containing graphite as its pigment, and (4) an ink containing a metallic sulfur compound as its pigment;
(c) a backing sheet bonded to the metallic effect ink-printed and embossed sheet; and
(d) visual information provided between the backing sheet and the metallic effect ink-printed and embossed sheet, the visual information being obscured by or visible through the metallic effect ink when viewing the product through the embossed sheet.

32. The product as recited in claim 31, wherein the metallic flakes are formed by vacuum metallizing a thin layer of metal on an embossed carrier.

33. The product as recited in claim 31, wherein the metallic flakes are formed by vacuum metallizing a thin layer of metal on an embossed release layer on a carrier.

34. The product as recited in claim 31, wherein an optical stack is formed on one side of the sheet.

35. A sheet as recited in claim 31, wherein a layer of pressure sensitive adhesive is positioned between said embossed surface and said backing sheet bearing visual information.

36. A sheet as recited in claim 31, wherein the ratio of binder to metallic flakes is great enough to bind the flakes to the embossed surface, and small enough to avoid quenching the optical effect caused by the embossment.

37. A sheet as recited in claim 31, wherein the volume ratio of binder to metallic flakes is in the range of 0.01 to 2.5.

38. A sheet as recited in claim 31, wherein the volume ratio of binder to metallic flakes is in the range of 0.5 to 1.0.

39. A sheet as recited in claim 31, wherein the ink contains sufficient binder to bond the flakes to the embossed surface while the amount of binder is below the amount required for the binder to substantially coat the embossed surface with binder.

40. A sheet as recited in claim 31, wherein the ink contains sufficient binder to bond the flakes to the embossed surface while the amount of binder is below the amount required for the binder to substantially fill the embossment and quench the optical effect of the embossment.

41. A sheet as recited in claim 31, wherein the metallic flakes have a thickness of 100 to 500 Angstroms.

42. A sheet as recited in claim 31, wherein the metallic flakes have an average diameter of 10 to 50 microns.

43. A sheet as recited in claim 31, wherein the metallic flakes are aluminum.

44. A sheet as recited in claim 31, wherein the ink includes a pigment formed of optical stacks.

45. A sheet as recited in claim 31, wherein the ink includes a pigment formed of optical stacks having an embossed surface.

46. A sheet as recited in claim 31, wherein an optical stack is formed on one side of the sheet.

47. A sheet as recited in claim 31, wherein the ink is formed of a binder and embossed metal flakes.

48. A sheet as recited in claim 47, wherein the metallic flakes have a thickness of 100 to 599 Angstroms.

49. A sheet as recited in claim 47, wherein the metallic flakes have an average diameter of 10 to 20 microns.

\* \* \* \* \*

UNITED STATES PATENT AND TRADEMARK OFFICE
CERTIFICATE OF CORRECTION

| | | |
|---|---|---|
| PATENT NO. : | 5,629,068 | Page 1 of 2 |
| DATED : | May 13, 1997 | |
| INVENTOR(S) : | Richard G. Miekka; Richard A. Fotland; Frederick N. Miekka; John J. Fitch; Karl Josephy | |

It is certified that error appears in the above-indentified patent and that said Letters Patent is hereby corrected as shown below:

TITLE PAGE:

Item [56], References Cited, under "U.S. PATENT DOCUMENTS" insert

| | | |
|---|---|---|
| 2,839,378 | 6/1958 | McAdow . . . . . . . . . . . 74/5 |
| 4,321,087 | 3/1982 | Levine et al . . . . . . . . 75/5 |
| 4,863,782 | 9/1989 | Wang et al . . . . . . 428/204 |
| 4,999,075 | 3/1991 | Coburn, Jr . . . . . . 156/209 |
| 5,084,351 | 12/1992 | Philips et al . . . 428/411.1 |

FOREIGN PATENT DOCUMENTS

| | | |
|---|---|---|
| A 02535432 | 1/1988 | Europe |
| A 0320638 | 6/1989 | Europe |
| A 9002658 | 3/1990 | PCT |
| A 9004812 | 5/1990 | PCT |
| A 2231572 | 11/1990 | Great Britain |

Column 1, line 42, replace "swipes" with -- stripes --.
Column 2, line 1, after "methods" delete the colon.
Column 2, line 21, replace "patients" with -- patterns --.
Column 2, line 32, change "preferable" to -- preferably --.
Column 2, line 39, after "three" delete the comma.
Column 3, line 22, replace "presented ha" with -- presented in --.
Column 3, line 41, replace "in printed" with -- imprinted --.
Column 3, line 61, replace "the applied" with -- then applied --.

UNITED STATES PATENT AND TRADEMARK OFFICE
CERTIFICATE OF CORRECTION

PATENT NO. : 5, 629,068
DATED : May 13, 1997
INVENTOR(S) : Richard G. Miekka; Richard A. Fotland; Frederick N. Miekka; John J. Fitch; Karl Josephy It is certified that error appears in the above-indentified patent and that said Letters Patent is hereby corrected as shown below:

Column 4, line 3, after "100" delete the comma.
Column 5, line 12, change "condition" to -- conditions --.
Column 6, line 19, after "Variable" delete the period.
Column 6, lines 33,34,35, replace "carder" with -- carrier -- (all occurrences).
Column 6, line 41, replace "frequency bat" with -- frequency but --.
Column 7, line 2, change "desire" to -- desired --.
Column 8, line 31, change "contain" to -- contains --.

Signed and Sealed this

Fourteenth Day of April, 1998

Attest:

BRUCE LEHMAN

*Attesting Officer*  *Commissioner of Patents and Trademarks*